US012299137B2

(12) United States Patent
Robinson et al.

(10) Patent No.: US 12,299,137 B2
(45) Date of Patent: May 13, 2025

(54) HOLISTIC EVALUATION OF VULNERABILITIES IN A VULNERABILITY CHAIN

(71) Applicant: International Business Machines Corporation, Armonk, NY (US)

(72) Inventors: Nikki Elyse Robinson, Davidsonville, MD (US); Leigh Chase, Andover (GB); Efran Himel, Cambridge, MA (US); Carter Hottovy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 18/089,888

(22) Filed: Dec. 28, 2022

(65) Prior Publication Data

US 2024/0220628 A1 Jul. 4, 2024

(51) Int. Cl.
*G06F 21/57* (2013.01)
*G06F 16/23* (2019.01)
*G06F 21/62* (2013.01)

(52) U.S. Cl.
CPC ........ *G06F 21/577* (2013.01); *G06F 16/2379* (2019.01); *G06F 21/6218* (2013.01); *G06F 2221/034* (2013.01)

(58) Field of Classification Search
CPC .............. G06F 21/554; G06F 21/602; G06F 2221/2141; G06F 2221/034;
(Continued)

(56) References Cited

U.S. PATENT DOCUMENTS 8,468,606 B2* 6/2013 Van De Weyer ..... G06F 21/554
726/28
9,276,951 B2* 3/2016 Choi ................... H04L 63/1433
(Continued)

FOREIGN PATENT DOCUMENTS

CN 113378178 A 9/2021
CN 113591092 A 11/2021
(Continued)

OTHER PUBLICATIONS

Jordan et al., TAXII™ Version 2.1, Jun. 10, 2021.
(Continued)

*Primary Examiner* — Mohamed Ibrahim
(74) *Attorney, Agent, or Firm* — Garg Law Firm, PLLC; Rakesh Garg; Anthony Mauricio Pallone

(57) ABSTRACT

An embodiment includes invoking a search of vulnerability chain data of a local database using a database query to obtain a search result, where the database query is based on a description string associated with a new vulnerability, and where the search result comprises a plurality of linked vulnerabilities that collectively form a vulnerability chain. The embodiment also includes identifying a vulnerability characteristic of a linked vulnerability of the plurality of linked vulnerabilities in the vulnerability chain. The embodiment also includes generating, as a new vulnerability chain, a modified version of the vulnerability chain by appending the new vulnerability to the vulnerability chain. The embodiment also includes assigning an updated vulnerability score to the new vulnerability based at least in part on the identified vulnerability characteristic of the linked vulnerability. The embodiment also includes updating the local database to include the new vulnerability chain and the updated vulnerability score.

20 Claims, 8 Drawing Sheets

(58) Field of Classification Search
CPC ............... G06F 16/2379; G06F 21/577; G06F 21/6218; H04L 63/102; H04L 63/1433; H04L 63/20
See application file for complete search history.

(56) References Cited

U.S. PATENT DOCUMENTS

| | | | |
|---|---|---|---|
| 9,443,086 | B2 | 9/2016 | Shankar |
| 10,114,954 | B1* | 10/2018 | Bellis ...................... G06N 20/00 |
| 10,606,825 | B1* | 3/2020 | Sosonkin ............ G06F 21/6227 |
| 10,803,061 | B2 | 10/2020 | Foo et al. |
| 10,979,446 | B1 | 4/2021 | Stevens et al. |
| 11,176,257 | B2* | 11/2021 | Braghin ................ H04L 9/0643 |
| 11,503,061 | B1* | 11/2022 | Lin .......................... G06N 5/04 |
| 11,503,075 | B1* | 11/2022 | Sirianni .............. H04L 63/1416 |
| 11,645,396 | B2* | 5/2023 | Inagaki ................. G06F 21/577 726/25 |
| 2014/0237545 | A1* | 8/2014 | Mylavarapu ........ H04L 63/1441 726/25 |
| 2017/0046519 | A1* | 2/2017 | Cam ......................... G06N 7/01 |
| 2017/0208084 | A1* | 7/2017 | Steelman ............ H04L 63/0209 |
| 2017/0208085 | A1* | 7/2017 | Steelman ............... G06N 20/00 |
| 2017/0286690 | A1* | 10/2017 | Chari .................... G06F 21/577 |
| 2019/0289029 | A1* | 9/2019 | Chawla ............... H04L 63/1425 |
| 2021/0160288 | A1* | 5/2021 | Crabtree ................ H04L 63/20 |
| 2021/0279338 | A1 | 9/2021 | Bowman et al. |
| 2021/0295439 | A1* | 9/2021 | Konrardy ............... G06Q 10/20 |
| 2021/0336984 | A1* | 10/2021 | Roytman ............ H04L 63/1466 |
| 2022/0014555 | A1* | 1/2022 | Crabtree ................ H04L 63/20 |
| 2022/0060507 | A1* | 2/2022 | Crabtree ............. H04L 63/1433 |
| 2022/0191230 | A1* | 6/2022 | Morgan ................. H04L 63/20 |
| 2022/0279015 | A1* | 9/2022 | Sambamoorthy ..... H04L 51/212 |
| 2022/0385678 | A1* | 12/2022 | Bobak .................... H04L 41/22 |
| 2023/0205891 | A1* | 6/2023 | Yellapragada ...... H04L 63/1433 726/25 |
| 2023/0289435 | A1* | 9/2023 | Mora-Golding ...... G06F 21/577 |
| 2023/0316192 | A1* | 10/2023 | Roytman ........... G06Q 10/0635 705/7.28 |
| 2023/0370486 | A1* | 11/2023 | Paquette ............. H04L 63/1433 |
| 2024/0146755 | A1* | 5/2024 | Ungureanu ........... H04L 41/145 |

FOREIGN PATENT DOCUMENTS

| | | |
|---|---|---|
| CN | 113824676 A | 12/2021 |
| CN | 114676435 A | 6/2022 |

OTHER PUBLICATIONS

Thomson et al., STIX/TAXII™ 2.0 Interoperability Test Document: Part 1 Version 1.1, Aug. 16, 2018.
Tai, What Is VPR and How Is It Different from CVSS?, Apr. 16, 2020, https://www.tenable.com/blog/what-is-vpr-and-how-is-it-different-from-cvss.
Jordan et al., STIX Version 2.1, Jun. 10, 2021.
Barnum, Standardizing Cyber Threat Intelligence Information with the Structured Threat Information expression (STIX), Feb. 20, 2014, https://stixproject.github.io/getting-started/whitepaper/.
Trellix, What Is the MITRE ATT&CK Framework?, 2022, https://www.trellix.com/en-us/security-awareness/cybersecurity/what-is-mitre-attack-framework.html.
MITRE, Getting Started, 2022, https://attack.mitre.org/resources/getting-started/.
Strom, ATT&CK 101, Sep. 20, 2018, https://medium.com/mitre-attack/att-ck-101-17074d3bc62.
Strom et al., MITRE ATT&CK: Design and Philosophy, Mar. 2020, https://www.mitre.org/news-insights/publication/mitre-attck-design-and-philosophy.
Alexander et al., MITRE ATT&CK for Industrial Control Systems: Design and Philosophy, Mar. 2020.
Jordan et al., STIX™ Version 2.0. Part 1: STIX Core Concepts, Jul. 19, 2017.
Jordan et al., TAXII™ 2.1 Interoperability Test Document Version 1.0, Mar. 30, 2022.
Wunder et al., TAXII™ Version 2.0, Jul. 19, 2017.

* cited by examiner

HOLISTIC EVALUATION OF VULNERABILITIES IN A VULNERABILITY CHAIN

BACKGROUND

The present invention relates generally to information technology system security. More particularly, the present invention relates to a method, system, and computer program for holistic evaluation of vulnerabilities in a vulnerability chain.

As computer systems become increasingly complex and interconnected, the number of security vulnerabilities increases. As a result, IT security professionals are finding it increasingly difficult to keep abreast of the latest security threats.

In the cybersecurity industry, various commercial or open-source tools, techniques and methods exist for the passive or active discovery of vulnerabilities. This includes simple so-called "fuzzing" tools (injection of random data into software), penetration testing programs ("pentesting") like the "bug bounty" campaigns carried out by ethical hackers, up to tools capable of automatically identifying vulnerabilities in a target.

These tools and analyses produce security documents in a structured or unstructured format, which briefly or extensively describe security problems, in particular vulnerabilities and their operating methods. Once a vulnerability has been detected and validated, it is generally documented through a description made public and published in the Common Vulnerabilities and Exposures (CVE). The CVE is a well-known directory of known vulnerabilities that includes a description of each vulnerability and a vulnerability score based on the Common Vulnerability Scoring System (CVSS), which provides a standardized way to individually analyze and score each vulnerability.

SUMMARY

The illustrative embodiments provide for holistic evaluation of vulnerabilities in a vulnerability chain. An embodiment includes invoking a search of vulnerability chain data of a local database using a database query to obtain a search result, where the database query is based on a description string associated with a new vulnerability, and where the search result comprises a plurality of linked vulnerabilities that collectively form a vulnerability chain. The embodiment also includes identifying a vulnerability characteristic of a linked vulnerability of the plurality of linked vulnerabilities in the vulnerability chain. The embodiment also includes generating, as a new vulnerability chain, a modified version of the vulnerability chain by appending the new vulnerability to the vulnerability chain. The embodiment also includes assigning an updated vulnerability score to the new vulnerability based at least in part on the identified vulnerability characteristic of the linked vulnerability. The embodiment also includes updating the local database to include the new vulnerability chain and the updated vulnerability score. Other embodiments of this aspect include corresponding computer systems, apparatus, and computer programs recorded on one or more computer storage devices, each configured to perform the actions of the embodiment.

An embodiment further includes identifying the vulnerability characteristic of the new vulnerability, and assigning updated vulnerability scores to the linked vulnerabilities based at least in part on the identified vulnerability characteristic of the new vulnerability.

In some embodiments, the vulnerability chain comprises a directed graph that includes data nodes that represent vulnerabilities, and edges represent paths between vulnerabilities. In some such embodiments, generating the new vulnerability chain includes traversing nodes along the paths over directed links in the directed graph and determining one of the data nodes of the directed graph to link to the new data node that represents the new vulnerability. In some embodiments, generating the new vulnerability chain includes adding a new data node to the directed graph representative of the new vulnerability and adding an edge to the directed graph defining a path between one of the data nodes and the new data node. In some such embodiments, adding the new data node includes adding a new path from a source node of the directed graph to a target node of the directed graph.

An embodiment further includes generating, based on the description string, a set of tokens of a database syntax, where the tokens are each matched to a respective fragment of the description string, and forming the database query using a sequence of the set of tokens. Some such embodiments, further include extracting a phrase from the description string of the new vulnerability description, where the tokens are each matched to a respective word of the phrase extracted from the description string.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
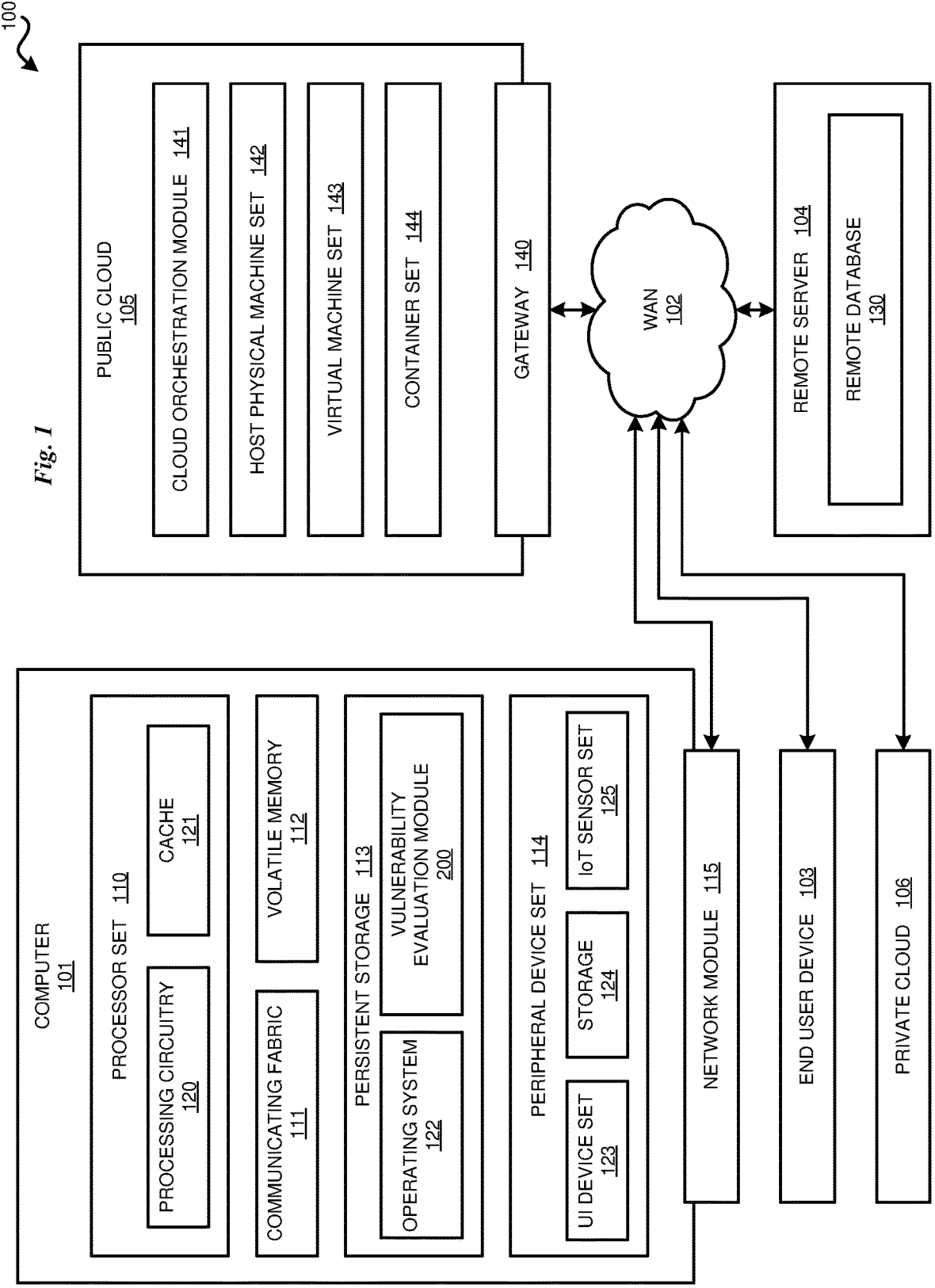
FIG. 1 depicts a block diagram of a computing environment in accordance with an illustrative embodiment.

When a new vulnerability is discovered, steps are usually taken to correct whatever flaw is being exploited. A vulnerability, as used herein, refers to a flaw in a software, firmware, hardware, or service component resulting from a weakness that can be exploited, causing a negative impact to the confidentiality, integrity, or availability of an impacted component or components. For example, if the vulnerability involves a flaw in the source code of a software product, the code is corrected, and a new version or "patch" is made available to prevent future attempts to use this vulnerability. However, in some cases, there may be many vulnerabilities that need to be addressed. However, it is not always straightforward to determine which are most serious and how they should be prioritized.

A common technique for prioritizing vulnerabilities is to use the CVSS score as a basis for the priorities. As a result, vulnerabilities that are scored as being low- or medium-risk may remain a low priority and may therefore not be corrected for significant amount of time.

The CVSS vulnerability score is determined based on the new vulnerability alone and does not account for other vulnerabilities with which the new vulnerability may be linked in a vulnerability chain. An evaluation of a new vulnerability in isolation may result in a determination that the new vulnerability is a low- or medium-risk vulnerability, resulting in the new vulnerability being given a relative low priority. This can be problematic because, in some cases, the evaluation of the new vulnerability in isolation overlooks the potential for the new vulnerability to be used with other vulnerabilities in a high-risk vulnerability chain. The new vulnerability is therefore given a lower priority than it should be given because this information is not currently available.

The disclosed embodiments address and provide a solution to this technical problem using an approach that introduces a holistic evaluation of vulnerabilities in a vulnerability chain. Exemplary embodiments disclose a process that pulls data from a remote database regarding a new vulnerability, and then searches a data store for records of vulnerability chains that include one or more vulnerabilities that are similar in some respect to the new vulnerability. The process uses a vulnerability chain from the search results as a basis for a new vulnerability chain that includes the new vulnerability.

The process then updates the vulnerability score of the new vulnerability by accounting for one or more characteristics of the other vulnerabilities and/or the vulnerability chain. In some cases, a vulnerability in isolation may appear to pose little risk and may be given a low- or medium-risk vulnerability score. However, when evaluated within the context of a high-risk vulnerability chain, the risk posed by the vulnerability is exposed as being higher than was apparent when the vulnerability was considered in isolation. As a result, the new vulnerability can be escalated to a more appropriate high-risk priority group.

In exemplary embodiments, a disclosed process pulls vulnerability data for a new vulnerability. In some embodiments, the new vulnerability is pulled from a remote vulnerability database. In some embodiments, remote vulnerability database is a public vulnerability database, such as the National Vulnerability Database (NVD) published by the National Institute of Standards and Technology (NIST). In some embodiments, the vulnerability data includes a vulnerability score and a description string associated with each new vulnerability. In some embodiments, the process periodically polls the vulnerability database for new vulnerabilities. In alternative embodiments, the process receives push notifications from the vulnerability database that notify the process about new vulnerabilities being available in the vulnerability database.

In exemplary embodiments, the process searches vulnerability chain data using a query based on the description of the new vulnerability. In some embodiments, when the process receives information about a new vulnerability, the process determines whether the new vulnerability may be used in a known vulnerability chain. For example, the process may include detecting that the new vulnerability achieves a result that is also achieved by a previously known vulnerability (or by a combination of previously known vulnerabilities) that has been used in one or more previously known vulnerability chains. In some such embodiments, the process includes assembling and evaluating a new vulnerability chain that includes the new vulnerability in place of the previously known vulnerability or adding the new vulnerability along a new path as an alternative to the previously known vulnerability.

In exemplary embodiments, the process invokes a search of known vulnerability chains. In some embodiments, the process searches one or more information sources, which may include one or more local and/or remote repositories. In an exemplary embodiment, the process invokes a search of a local SIEM database. In some embodiments, the vulnerability data for the new vulnerability includes a description string that includes key details about the new vulnerability, such as a vulnerability type (e.g., cross-site scripting, SQL injection, etc.), name(s) and version(s) of software and/or hardware products affected by the new vulnerability, and inputs and/or processes required to exploit the vulnerability. In some such embodiments, the process generates a database query based on one or more words from the vulnerability description string associated with the new vulnerability. For example, in some embodiments, the process may include using a key word or phrase matching technique that includes extracting key words from the vulnerability description and then building one or more database queries using the extracted key words. For example, the process may include assembling a query for vulnerabilities that affect any version of the same product that is affected by the new vulnerability, and/or a query for vulnerabilities that are the same type and require the same inputs as the new vulnerability, and/or various other queries. In some embodiments, the process may include accessing query templates that are used to assemble database queries. In some such embodiments, the process includes selecting from among the available templates depending on the information available in the description string associated with the new vulnerability. For example, if the description string lacks information about inputs required to exploit the new vulnerability, the process will use only the templates that do not require information about the inputs. The process then issues the query to the SIEM database (or other data source).

In exemplary embodiments, the process evaluates a vulnerability chain received with the search results. For example, if the query was issued to a SIEM database, the process includes receiving a response from the SIEM database that includes a list of one or more vulnerability chains that include at least one previously known vulnerability that matches the query (or responds with an indication that no records match the query). The format and content of the search results may vary depending, for example, on how the data is organized in the SIEM database. For example, the SIEM database may return a list of one or more vulnerability chains, where each vulnerability chain includes a plurality of linked vulnerabilities.

In exemplary embodiments, the process includes analyzing each vulnerability chain received in the search results to determine how the vulnerability chain may be modified to use the new vulnerability. In some embodiments, the process identifies one or more vulnerability characteristics of one or more of the vulnerabilities in the vulnerability chain to determine whether any of the vulnerabilities may be replaced with the new vulnerability. For example, the process may identify a vulnerability that is linked to other vulnerabilities in a known vulnerability chain and may detect that this linked vulnerability affects the same product as the new vulnerability but affects an older version of the same product. The process may then recognize that the new vulnerability may be used as an alternative to the linked vulnerability in situations where the newer version of the product is being exploited. In some embodiments, the process may include accessing rules for recognizing such potential substitutions. In some such embodiments, the process evaluates the query results for patterns that match any of the rules, and then identifies vulnerability substitutions by identifying patterns that satisfy one or more of the rules.

In exemplary embodiments, the process generates a new vulnerability chain by appending the new vulnerability to the vulnerability chain received with search results. In some embodiments, the process generates a new vulnerability chain that includes the new vulnerability. For example, in some embodiments, the process generates a new vulnerability chain by generating a copy of the known vulnerability chain and then appending the new vulnerability to the copy of the known vulnerability chain. Alternatively, in some embodiments, the process generates a new vulnerability chain by modifying the known vulnerability chain rather than creating a new copy of the known vulnerability chain. In some such embodiments, the process appends the new vulnerability to the copy of the known vulnerability chain by adding a new path that includes the new vulnerability as an alternative to the matching previously linked vulnerability.

In exemplary embodiments, the process updates the vulnerability score of the new vulnerability. In some embodiments, the new vulnerability includes a score that is indicative of the severity of the vulnerability. In some embodiments, the score is provided with the vulnerability data that the process receives from the vulnerability database. The score may be a numerical (e.g., on a scale of 0-10) or textual (e.g., low, medium, or high) representation of the severity of the vulnerability itself, i.e., in isolation. For example, in some embodiments, the new vulnerability includes a CVSS score.

In exemplary embodiments, the process evaluates the new vulnerability within the context of the new vulnerability chain. In some embodiments, the process assigns an updated vulnerability score to the new vulnerability that accounts for potentially higher risks that may result from using the new vulnerability with other vulnerabilities in a new high-risk vulnerability chain. In some cases, this process may change a score indicative of a low- or medium-risk vulnerability (based on the vulnerability in isolation) to an updated score indicative of a high- or critical-risk vulnerability. This, in turn, advantageously allows the priority of the new vulnerability to be escalated to prevent exploitation of the new vulnerability in the new high-risk vulnerability chain. In some embodiments, the updated vulnerability score is based on one or more vulnerability characteristics of the new vulnerability in combination with one or more vulnerability characteristics of other vulnerabilities in the new vulnerability chain and/or one or more vulnerability characteristics of the new vulnerability chain.

In exemplary embodiments, the process identifies the CVSS score of a new vulnerability being added to a new vulnerability chain. The updated vulnerability score is based on a combination of several subsets of scores. In the illustrated embodiment, the CVSS score for the new vulnerability (based on the vulnerability in isolation) is used as a base score component.

In exemplary embodiments, the process extracts characteristic(s) of one or more other vulnerabilities in new vulnerability chain. In some embodiments, these characteristics are used as a basis for determining subscore characteristics of the vulnerability chain, which in turn are used to determine a score modifier that, in turn, is used to update the vulnerability score of the new vulnerability. In some embodiments, the vulnerability chain characteristics include a tension subscore, a breakpoint subscore, a link assurance subscore, and a robustness subscore that allow for more effective prioritization. These four subscores are determined using metrics for assessing the gross relative risk of the vulnerability chain, the probability of mitigating the vulnerabilities in the chain, the probability of a successful attack, and the susceptibility of the vulnerable component.

In exemplary embodiments, the process determines a score modifier based on the extracted characteristic(s). In some embodiments, these metrics are used to assign respective scores to the vulnerability chain, which are then normalized and may be assigned respective weights according to user preferences that allow for one or more of these metrics to be emphasized or de-emphasized. The normalized, weighted values may then be combined to generate a single score modifier that can be applied to the individual vulnerability scores of each of the vulnerabilities in the vulnerability chain. In some cases, this may result in an increase in one or more of the vulnerability scores, which in turn may result in an increase in the priority of these vulnerabilities.

In exemplary embodiments, the process updates the vulnerability chain database to include the new vulnerability chain. In some embodiments, the process updates the SIEM database to include the new vulnerability, the new vulnerability chain, and the updated vulnerability score. In some embodiments, the may also, or alternatively, provide the new vulnerability, the new vulnerability chain, and/or the updated vulnerability score to one or more other data sources.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved vulnerability evaluation module 200 that performs holistic evaluation of vulnerabilities in a vulnerability chain. In addition to vulnerability evaluation module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vulnerability evaluation module 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in vulnerability evaluation module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in vulnerability evaluation module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
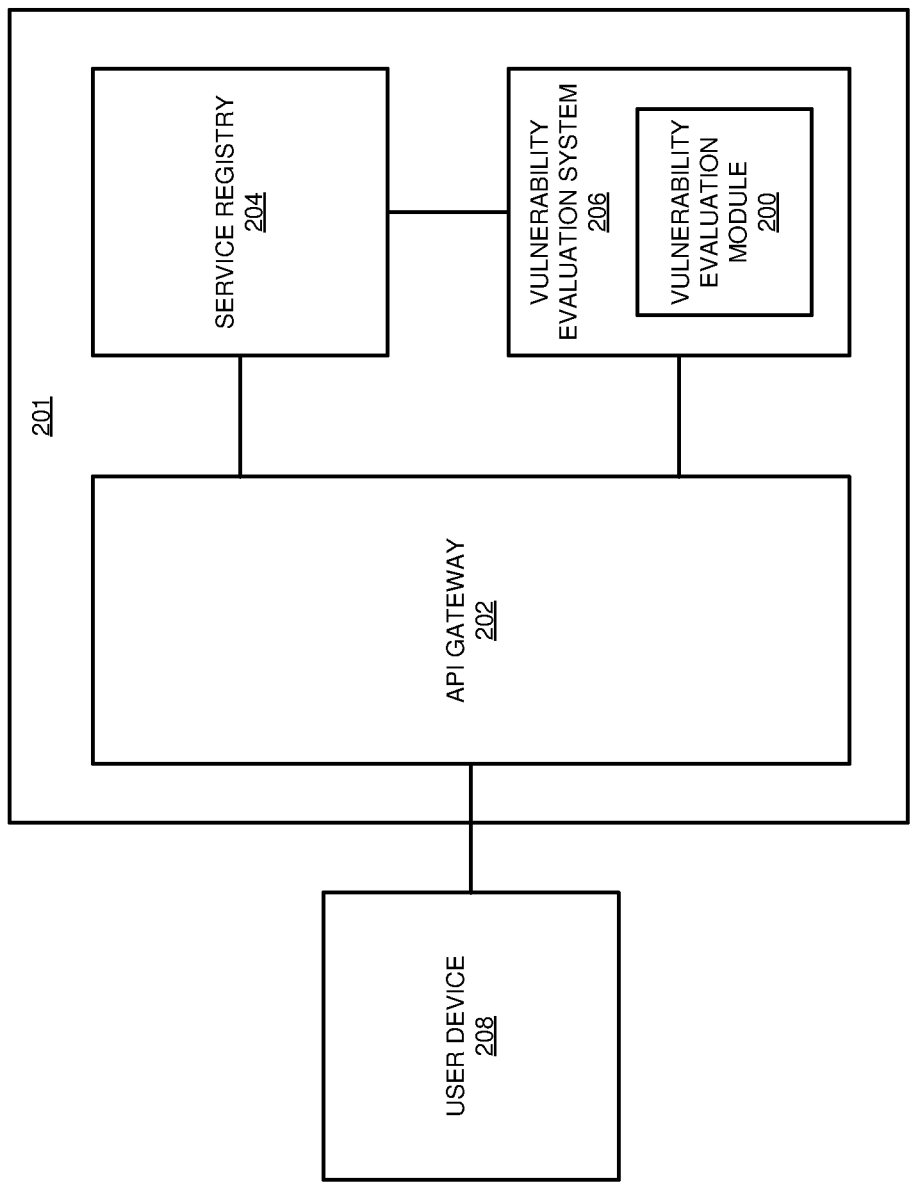
FIG. 2 depicts a block diagram of an example service infrastructure in accordance with an illustrative embodiment.

With reference to FIG. 2, this figure depicts a block diagram of an example service infrastructure 201 in accordance with an illustrative embodiment. In the illustrated embodiment, the service infrastructure 201 includes a vulnerability evaluation system 206. In an embodiment, the vulnerability evaluation system 206 is an example of the computer 101 of FIG. 1 and includes the vulnerability evaluation module 200 of FIG. 1.

In the illustrated embodiment, the service infrastructure 201 provides services and service instances to a user device 208. User device 208 communicates with service infrastructure 201 via an API gateway 202. In various embodiments, service infrastructure 201 and its associated vulnerability evaluation system 206 serve multiple users and multiple tenants. A tenant is a group of users (e.g., a company) who share a common access with specific privileges to the software instance. Service infrastructure 201 ensures that tenant specific data is isolated from other tenants.

In the illustrated embodiment, service infrastructure 201 includes a service registry 204. In some embodiments, the vulnerability evaluation system 206 is a virtual machine and the service registry 204 looks up service instances of vulnerability evaluation system 206 in response to a service lookup request such as one from API gateway 202 in response to a service request from user device 208. For example, in some embodiments, the service registry 204 looks up service instances of vulnerability evaluation system 206 in response to requests related to information extraction from the user device 208.

In some embodiments, service registry 204 maintains information about the status or health of each service instance including performance information associated each of the service instances. In some such embodiments, such information may include various types of performance characteristics of a given service instance (e.g., cache metrics, etc.) and records of updates.

In some embodiments, user device 208 connects with API gateway 202 via any suitable network or combination of networks such as the Internet, etc. and uses any suitable communication protocols such as Wi-Fi, Bluetooth, etc. Service infrastructure 201 may be built on the basis of cloud computing. API gateway 202 provides access to client applications like the vulnerability evaluation module 200. API gateway 202 receives service requests issued by client applications and creates service lookup requests based on service requests. As a non-limiting example, in an embodiment, the user device 208 executes a routine to initiate interaction with the vulnerability evaluation module 200. For instance, in some embodiments, the user accesses the vulnerability evaluation module 200 directly using a command line or GUI. Also, in some embodiments, the user accesses the vulnerability evaluation module 200 indirectly through the use of a web application that interacts with the vulnerability evaluation module 200 via the API gateway 202.

Figure 3:
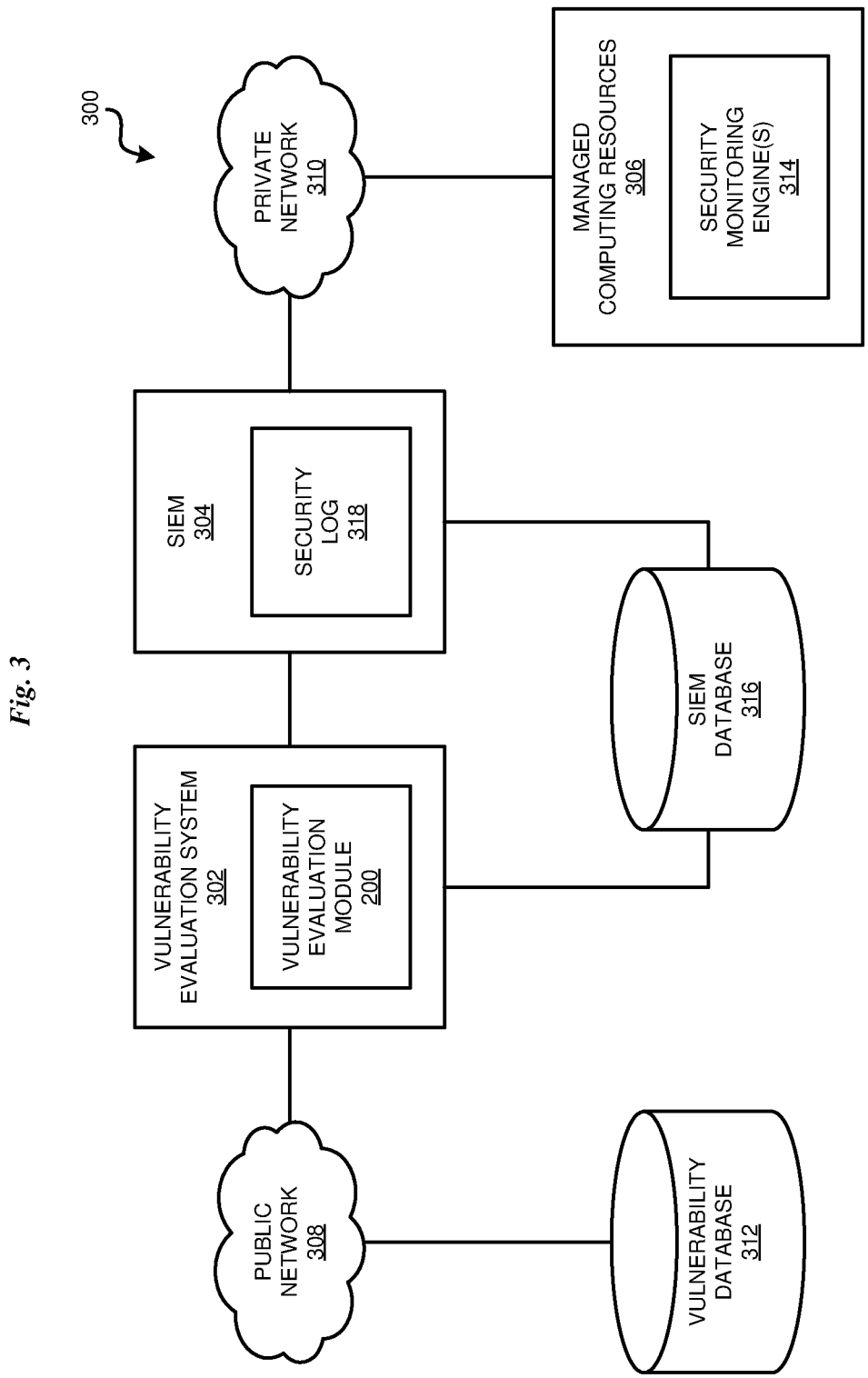
FIG. 3 depicts a functional block diagram of an exemplary processing environment in accordance with an illustrative embodiment.

With reference to FIG. 3, this figure depicts a functional block diagram of an exemplary processing environment 300 in accordance with an illustrative embodiment. In the illustrated embodiment, the processing environment 300 includes a vulnerability evaluation system 302, which in some embodiments is an example of the vulnerability evaluation system 206 of FIG. 2.

In the illustrated embodiment, the processing environment 300 includes a one or more managed computing resources 306 that communicate with each other via a dedicated private network 310. Each of the one or more managed computing resources 306 can be a system that includes a variety of electronic devices and/or components. The one or more managed computing resources 306 can be configured to control user devices, detect inconsistencies in the operation of one or more user devices, store user data, and/or protect stored user data from network-based attacks.

The private network 310 can be a privately accessible network of linked networks, possibly operated by various distinct parties, such as a personal area network, local area network, wide area network, cable network, satellite network, cellular telephone network, etc. or combination thereof, each with access to and/or from the Internet. The private network 310 can provide a direct connection between the one or more managed computing resources 306.

In some embodiments, as discussed below, the one or more managed computing resources 306 also have access to publicly accessible networks, such as the Internet. Each of the one or more managed computing resources 306 can include an access server and/or router that enforces a separation between the publicly accessible network and the private network 310.

Each of the one or more managed computing resources 306 can be located in a different geographic location. For example, one of the one or more managed computing resources 306 can be located in a first country (e.g., the United States of America), while another of the one or more managed computing resources 306 can be located in a second country (e.g., the United Kingdom), and so on. Alternatively, each of the one or more managed computing resources 306 may reside at a common geographic location.

In an embodiment, each of the one or more managed computing resources 306 is identical in composition and operation. The one or more managed computing resources 306 can operate in real-time to replicate data between or among the various one or more managed computing resources 306 to ensure that the sum of aggregate data is present in one or more managed computing resources 306 locations. This redundancy not only improves the reliability of the multi-node environment, but also enhances the threat-detecting capability of the one or more managed computing resources 306. For example, the one or more managed computing resources 306 may independently identify Internet Protocol (IP) addresses from which one or more attacks on the respective managed computing resource 306 (e.g., to disable or impair the functionality of the respective managed computing resources 306) or attempted intrusions into the respective managed computing resource 306 have originated. A node, such as respective managed computing resources 306, may transmit a routing table that includes the IP addresses that the respective managed computing resources 306 has identified as a threat to one or more of the other respective managed computing resources 306 so that the other managed computing resources 306 can update their routing tables accordingly. Thus, by sharing routing tables between one or more managed computing resources 306, an address identified as a threat at one node can be blocked by the other nodes in the environment.

In other embodiments, the one or more managed computing resources 306 are not identical in composition and/or operation. For example, the one or more managed computing resources 306 may include additional components required by the jurisdiction in which the respective managed computing resources 306 resides to comply with one or more security standards (or may not include components that cannot be included in the respective managed computing resource managed computing resources 306 to comply with one or more security standards). Any of a variety of alternate architectures may be used for some or all of the one or more managed computing resources 306.

In the illustrated embodiment, the processing environment 300 includes a security information and event management (SIEM) system 304. The SIEM 304 may provide boundary security. The SIEM 304 may receive third party threat data from external sources (e.g., from a public vulnerability database 312 via the public network 308) that is stored in the SIEM database 316 and used by the SIEM 304 to enhance the monitoring and detection functionality. For example, the SIEM 304 may periodically receive updated lists or ranges of Internet Protocol (IP) addresses that have been identified as suspicious or from which malicious activity has originated (e.g., by malware analysis software). The lists may be in the form of a routing table (e.g., an internal address resolution protocol (ARP) routing table) that the SIEM 304 can use to compare with the source and/or destination address of incoming and/or outgoing packets. The SIEM 304 can be automatically updated each time the third-party threat data is received from external sources. Alternatively, the SIEM 304 can be updated once the received third party threat data is processed by the vulnerability evaluation system 302. In an embodiment, the one or more managed computing resources 306 can share such received third party threat data via the private network 310.

Each of the one or more managed computing resources 306 may be a single computing device or may include multiple distinct computing devices, such as computer servers, logically or physically grouped together to collectively operate as a system. The components of each of the one or more managed computing resources 306 can be implemented in application-specific hardware (e.g., a server computing device with one or more ASICs) such that no software is necessary, or as a combination of hardware and software. In addition, the modules and components of each of the one or more managed computing resources 306 can be combined on one server computing device or separated individually or into groups on several server computing devices.

In the illustrated embodiment, one or more managed computing resources 306 include respective security monitoring engine(s) 314. Security monitoring engines 314 may be provided in association with these managed computing resources, such as agents deployed and executing on endpoint computing devices, which collect security events and provide the security event data to the SIEM 304 where it is logged in a security log data structure 318. In some illustrative embodiments, the security monitoring engine(s) 314 themselves may be considered an extension of the SIEM 304 and may apply SIEM rules to perform analysis of the security events to identify event data indicative of suspicious activity that may be indicative of a security attack or vulnerability, triggering a security alert or security log entry to be generated. Moreover, the security monitoring engine(s) 314 may provide such security event log information to the SIEM 304 for further evaluation. In other illustrative embodiments, the security event data gathered by the security monitoring engines 314 may be provided to the SIEM 304 for logging in a security log 318 and for generation of security alerts.

In some embodiments, the features and services provided by each of the one or more managed computing resources 306 may be implemented as web services consumable via the public network 308. In further embodiments, each of the one or more managed computing resources 306 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In an embodiment, the vulnerability evaluation system 302 operates to perform holistic evaluation of vulnerabilities in a vulnerability chain. In some embodiments, the vulnerability evaluation system 302 periodically pulls or receives information about new vulnerabilities from a public vulnerability database 312. The vulnerability evaluation module 200 updates vulnerability chains in the SIEM database 316 that may be altered to incorporate a new vulnerability. In some embodiments, new vulnerabilities include Common Vulnerability Scoring System (CVSS) scores. In some such embodiments, when the vulnerability evaluation module 200 identifies a vulnerability chain that may incorporate a new vulnerability, the vulnerability evaluation module 200 appends the new vulnerability to the vulnerability chain and calculates an updated score for the new vulnerability as incorporated in the vulnerability chain. In some such embodiments, the updated score is a function of one or more characteristics of other vulnerabilities in the vulnerability chain to which the new vulnerability has been appended.

Figure 4:
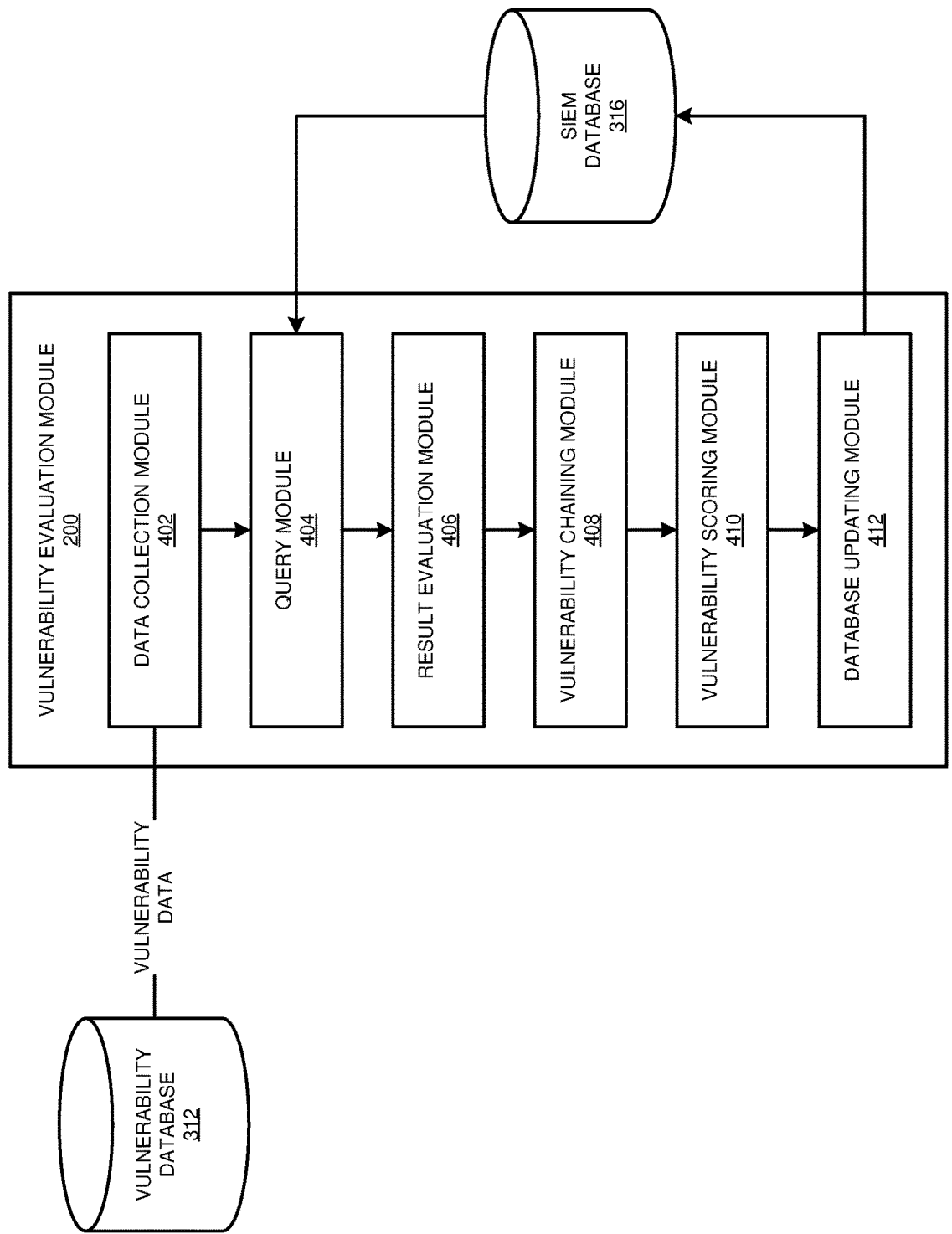
FIG. 4 depicts a functional block diagram of an exemplary vulnerability evaluation module in accordance with an illustrative embodiment.

With reference to FIG. 4, this figure depicts a functional block diagram of an exemplary vulnerability evaluation module 200 in accordance with an illustrative embodiment. In the illustrated embodiment, the vulnerability evaluation module 200 includes data collection module 402, a query module 404, a result evaluation module 406, a vulnerability chaining module 408, a vulnerability scoring module 410, and a database updating module 412. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the data collection module 402 pulls vulnerability data representative of new vulnerabilities from remote vulnerability database 312. In some embodiments, the vulnerability data includes a vulnerability score and a description string associated with each new vulnerability. In some embodiments, the data collection module 402 periodically polls the vulnerability database 312 for new vulnerabilities. In alternative embodiments, the data collection module 402 receives a push notification from the vulnerability database 312 that notifies the data collection module 402 about new vulnerabilities being available in the vulnerability database 312.

When the vulnerability evaluation module 200 receives information about a new vulnerability, it may take several actions, such as notifying other network devices (e.g., the SIEM 304 of FIG. 2) and storing vulnerability data about the new vulnerability in a local database (e.g., SIEM database 316). The vulnerability evaluation module 200 also determines whether the new vulnerability may be used in a known vulnerability chain. For example, the vulnerability evaluation module 200 may detect that the new vulnerability achieves a result that is also achieved by a previously known vulnerability (or by a combination of previously known vulnerabilities) that has been used in one or more previously known vulnerability chains. The vulnerability evaluation module 200 will then assemble and evaluate a new vulnerability chain that includes the new vulnerability in place of the previously known vulnerability or adds the new vulnerability along a new path as an alternative to the previously known vulnerability.

In the illustrated embodiment, the query module 404 invokes a search of known vulnerability chains stored in the local SIEM database 316. In some embodiments, the vulnerability data for the new vulnerability includes a description string that includes key details about the new vulnerability, such as a vulnerability type (e.g., cross-site scripting, SQL injection, etc.), name(s) and version(s) of software and/or hardware products affected by the new vulnerability, and inputs and/or processes required to exploit the vulnerability. In some such embodiments, the query module 404 generates a database query based on one or more words from the vulnerability description string associated with the new vulnerability. For example, in some embodiments, the query module 404 may include using a key word or phrase matching technique that includes extracting key words from the vulnerability description and then building one or more database queries using the extracted key words. For example, the query module 404 may assemble a query for vulnerabilities that affect any version of the same product that is affected by the new vulnerability, and/or a query for vulnerabilities that are the same type and require the same inputs as the new vulnerability, and/or various other queries. In some embodiments, the query module 404 may include query templates that are used to assemble database queries. In some such embodiments, the query module 404 selects from among the available templates depending on the information available in the description string associated with the new vulnerability. For example, if the description string lacks information about inputs required to exploit the new vulnerability, the query module 404 will use only the templates that do not require information about the inputs.

The query module 404 issues the query to the SIEM database 316. If the SIEM database 316 responds to the query with a list of one or more vulnerability chains that include at least one previously known vulnerability that matches the query (or responds with an indication that no records match the query). The format and content of the search results may vary depending, for example, on how the data is organized in the SIEM database 316. For example, the SIEM database 316 may return a list of one or more vulnerability chains, where each vulnerability chain includes a plurality of linked vulnerabilities.

The query result is provided to the result evaluation module 406. The result evaluation module 406 analyzes each vulnerability chain to determine how the vulnerability chain may be modified to use the new vulnerability. In some embodiments, the result evaluation module 406 identifies one or more vulnerability characteristics of one or more of the vulnerabilities in the vulnerability chain to determine whether any of the vulnerabilities may be replaced with the new vulnerability. For example, the result evaluation module 406 may identify a vulnerability that is linked to other vulnerabilities in a known vulnerability chain and may detect that this linked vulnerability affects the same product as the new vulnerability but affects an older version of the same product. The result evaluation module 406 may then recognize that the new vulnerability may be used as an alternative to the linked vulnerability in situations where the newer version of the product is being exploited. In some embodiments, the result evaluation module 406 may include rules for recognizing such potential substitutions. In some such embodiments, the result evaluation module 406 evaluates the query results for patterns that match any of the rules, and then identifies vulnerability substitutions by identifying patterns that satisfy one or more of the rules.

If the result evaluation module 406 determines that a known vulnerability chain may be altered to use the new vulnerability, the result evaluation module 406 provides this information to the vulnerability chaining module 408. The vulnerability chaining module 408 then generates a new vulnerability chain that includes the new vulnerability. For example, in some embodiments, the vulnerability chaining module 408 generates a new vulnerability chain by generating a copy of the known vulnerability chain and then appending the new vulnerability to the copy of the known vulnerability chain. Alternatively, in some embodiments, the vulnerability chaining module 408 generates a new vulnerability chain by modifying the known vulnerability chain rather than creating a new copy of the known vulnerability chain. In some such embodiments, the vulnerability chaining module 408 appends the new vulnerability to the copy of the known vulnerability chain by adding a new path that includes the new vulnerability as an alternative to the matching previously linked vulnerability.

The vulnerability chaining module 408 then provides the new vulnerability chain to the vulnerability scoring module 410. In some embodiments, the new vulnerability includes a score that is indicative of the severity of the vulnerability. In some embodiments, the score is provided with the vulnerability data that the vulnerability evaluation module 200 receives from the vulnerability database 312. The score may be a numerical (e.g., on a scale of 0-10) or textual (e.g., low, medium, or high) representation of the severity of the vulnerability itself, i.e., in isolation. For example, in some embodiments, the new vulnerability includes a CVSS score.

When a new vulnerability is discovered, steps are usually taken to correct whatever flaw is being exploited. For example, if the vulnerability involves a flaw in the source code of a software product, the code is corrected, and a new version or "patch" is made available to prevent future attempts to use this vulnerability. However, in some cases, there may be many vulnerabilities that need to be addressed. The vulnerability scores are often used as a basis for prioritizing these vulnerabilities. As a result, vulnerabilities that are scored as being low- or medium-risk may remain a low priority and may therefore not be corrected for significant amount of time.

The received vulnerability score is determined based on the new vulnerability alone and does not account for other vulnerabilities with which the new vulnerability may be linked in a vulnerability chain. An evaluation of a new vulnerability in isolation may result in a determination that the new vulnerability is a low- or medium-risk vulnerability, resulting in the new vulnerability being given a relative low priority. This can be problematic because, in some cases, the evaluation of the new vulnerability in isolation overlooks the potential for the new vulnerability to be used with other vulnerabilities in a high-risk vulnerability chain. The new vulnerability is therefore given a lower priority than it should be given because this information is not currently available.

The vulnerability scoring module 410 evaluates the new vulnerability within the context of the new vulnerability chain generated by the vulnerability chaining module 408. This allows the vulnerability scoring module 410 to assign an updated vulnerability score to the new vulnerability that accounts for potentially higher risks that may result from using the new vulnerability with other vulnerabilities in a new high-risk vulnerability chain. In some cases, a score indicative of a low- or medium-risk vulnerability based on the vulnerability in isolation may be changed to an updated score indicative of a high- or critical-risk vulnerability. This, in turn, allows the priority of the new vulnerability to be escalated to prevent exploitation of the new vulnerability in the new high-risk vulnerability chain. In some embodiments, the updated vulnerability score is based on one or more vulnerability characteristics of the new vulnerability in combination with one or more vulnerability characteristics of other vulnerabilities in the new vulnerability chain and/or one or more vulnerability characteristics of the new vulnerability chain.

In the illustrated embodiment, the vulnerability scoring module 410 provides the updated vulnerability score to the database updating module 412. The database updating module 412 then updates the SIEM database 316 to include the new vulnerability, the new vulnerability chain, and the updated vulnerability score. In some embodiments, the database updating module 412 may also, or alternatively, provide the new vulnerability, the new vulnerability chain, and/or the updated vulnerability score to the vulnerability database 312.

Figure 5:
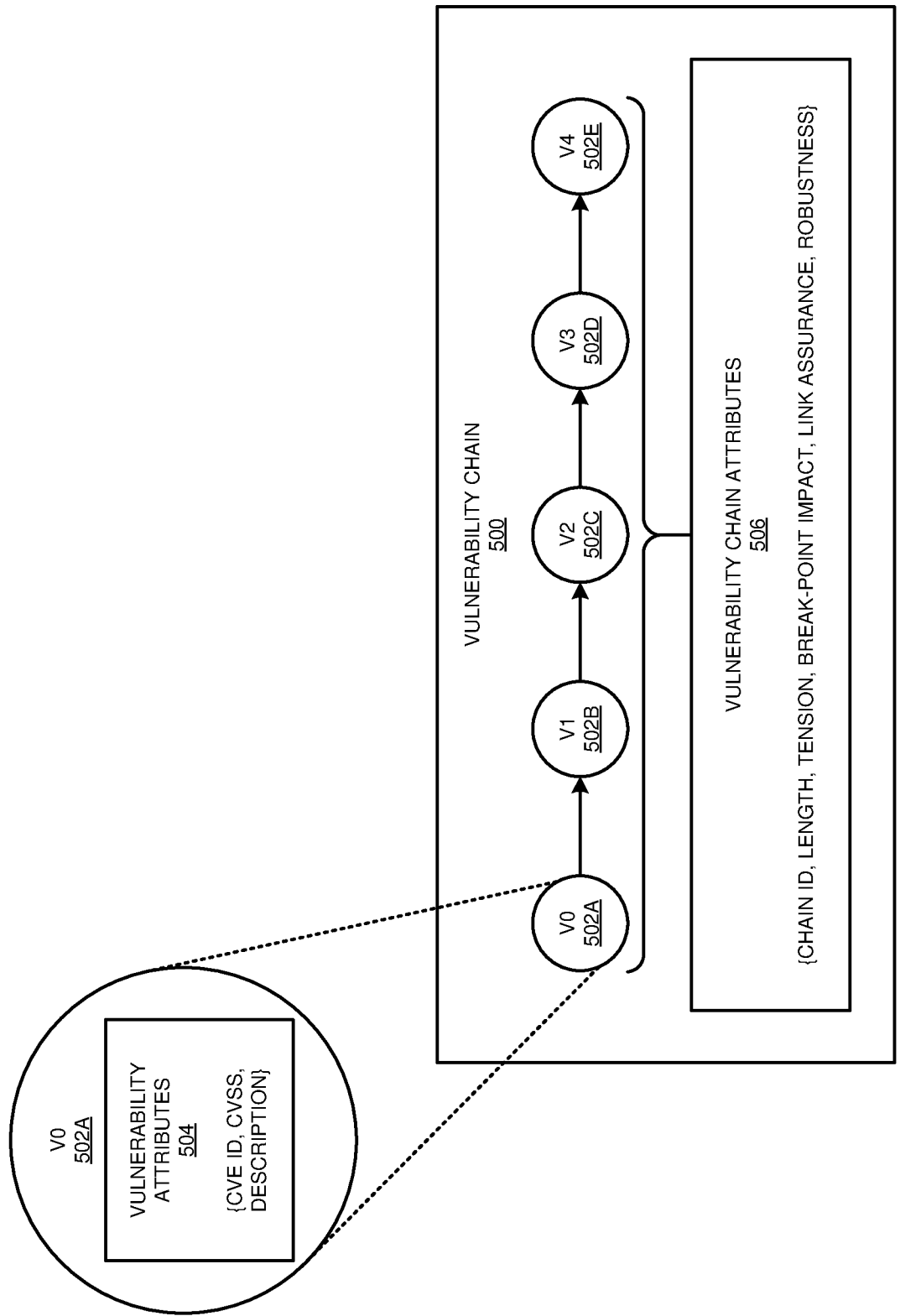
FIG. 5 depicts a block diagram of a simplified example vulnerability chain in accordance with an illustrative embodiment.

With reference to FIG. 5, this figure depicts a block diagram of a simplified example vulnerability chain 500 in accordance with an illustrative embodiment. The vulnerability chain 500 is an example of a data structure used for storing vulnerability chain data in a database. The vulnerability chain 500 shown in FIG. 5 is shown for clarity purposes as a non-limiting example of a vulnerability chain referenced in disclosed embodiments. The vulnerability chain 500 may be an example of a known vulnerability chain (e.g., received from the SIEM database 316 in response to a query from the query module 404 of FIG. 4) or an updated or new vulnerability chain (e.g., generated by the vulnerability chaining module 408 of FIG. 4).

In the illustrated embodiment, the vulnerability chain 500 includes a total of five vulnerability nodes 502A-502E representative of respective vulnerabilities V0-V4. In the illustrated embodiment, vulnerability node 502A is the beginning point of the vulnerability chain 500. The vulnerability node 502A is representative of a vulnerability V0, which, if successfully exploited, leads to vulnerability V1 at vulnerability 502B. The vulnerability node 502B, if successfully exploited, leads to vulnerability V2 at vulnerability 502C, and so on until an overall exploit goal is achieved upon successfully exploiting the vulnerability V4 at vulnerability 502E. As illustrated for vulnerability V0 (and equally applicable to vulnerabilities V1-V4), each vulnerability includes vulnerability attributes 504 such as a Common Vulnerabilities and Exposures (CVE) identifier string, a CVSS score, and a description. Also, the vulnerability chain 500 includes vulnerability chain attributes 506 that are applicable to the vulnerability chain 500. In the illustrated example, the vulnerability chain attributes 506 include the following properties with exemplary data types indicated in parenthesis:

Chain ID (integer): uniquely identifies the chain for reference purposes.

Length (integer): the number of vulnerabilities connected by the chain, end-to-end and inclusive of terminal vertices.

Tension (float): provides an indicator of a chain's potency or relative gross risk relative to that of other vulnerability chains.

Break-point impact (vector<float>): a vector having components that align with the indices of the vulnerabilities in the vulnerability chain. For each vulnerability in the vulnerability chain, the vector includes a numerical probability that mitigating the respective vulnerability will break the vulnerability chain, thus defeating any attack vector based upon that vulnerability chain.

Link assurance (vector<float>): a vector having components that align with the indices of the vulnerabilities in the vulnerability chain. For each vulnerability in the vulnerability chain, the vector includes a numerical probability of a successful attack using the respective vulnerability.

Robustness (float): a real-numbered value that is calculated as a function of the CVSS exploitability attributes (attack vector, attack complexity, privileges required, and user interaction), which reflect the characteristics of the thing that is vulnerable, referred to formally as the vulnerable component.

In some embodiments, the tension value is the result of a tension evaluation function applied to CVSS attributes of vulnerabilities within a vulnerability chain. In some embodiments, the break-point impact vector is output by a break-point evaluation function and the probabilities are Kolmogorov probabilities. In some embodiments, the link assurance vector is the result of a link assurance function. In some embodiments, the link assurance values increase from until the first node vulnerability 502A to the terminal link at the vulnerability 502E, at which point the value is either indicative of guaranteed success or some other value greater than at the assurance value at the vulnerability 502A. The assurance values demonstrate how each state 'builds' the exploit case and increases the likelihood of a successful attack. In some embodiments, the robustness value is the result of a robustness evaluation function that takes as its input the exploitability attributes of CVSS data for each of the vulnerabilities in the vulnerability chain.

Figure 6:
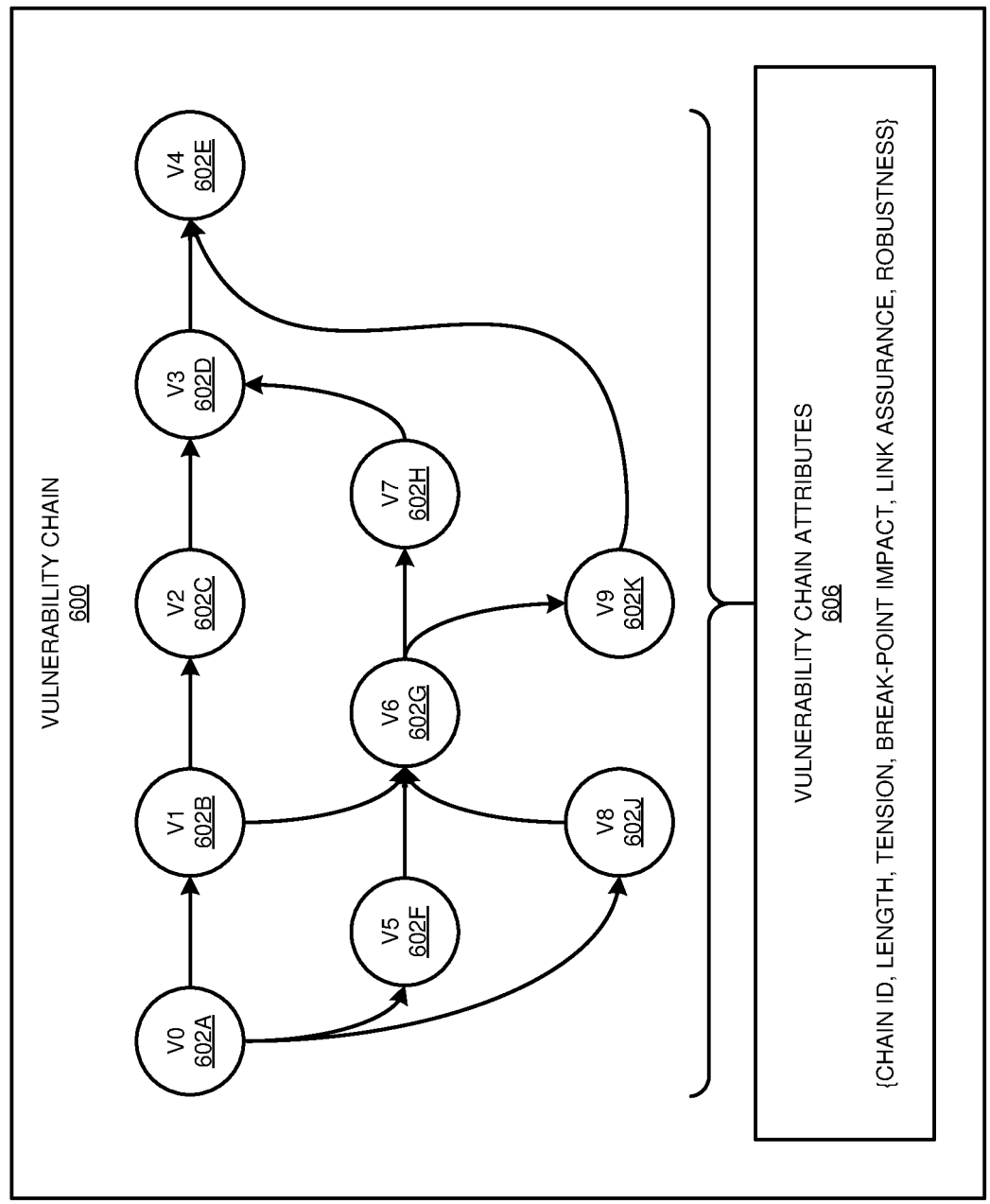
FIG. 6 depicts a block diagram of a simplified example vulnerability chain in accordance with an illustrative embodiment.

With reference to FIG. 6, this figure depicts a block diagram of a simplified example vulnerability chain 600 in accordance with an illustrative embodiment. The vulnerability chain 600 is an example of a data structure used for storing vulnerability chain data in a database. The vulnerability chain 600 shown in FIG. 6 is shown for clarity purposes as a non-limiting example of a vulnerability chain referenced in disclosed embodiments. The vulnerability chain 600 may be an example of a known vulnerability chain (e.g., received from the SIEM database 316 in response to a query from the query module 404 of FIG. 4) or an updated or new vulnerability chain (e.g., generated by the vulnerability chaining module 408 of FIG. 4).

In the illustrated embodiment, the vulnerability chain 600 includes a total of ten vulnerability nodes 602A-602K representative of respective vulnerabilities V0-V9. In some embodiments, each of the vulnerabilities V0-V9 includes a respective set of vulnerability attributes (e.g., vulnerability attributes 504 shown in FIG. 5). Also, the vulnerability chain 600 includes vulnerability chain attributes 606 as described in connection with the vulnerability chain attributes 506 of FIG. 5. The vulnerability chain 600 illustrates that vulnerability chains as described herein may vary greatly in terms of complexity, and may include one or more alternative paths (e.g., where vulnerabilities V5-V7 may be exploited instead of vulnerabilities V1 and V2, or vulnerability V8 may be exploited instead of vulnerability V5, etc.).

Figure 7:
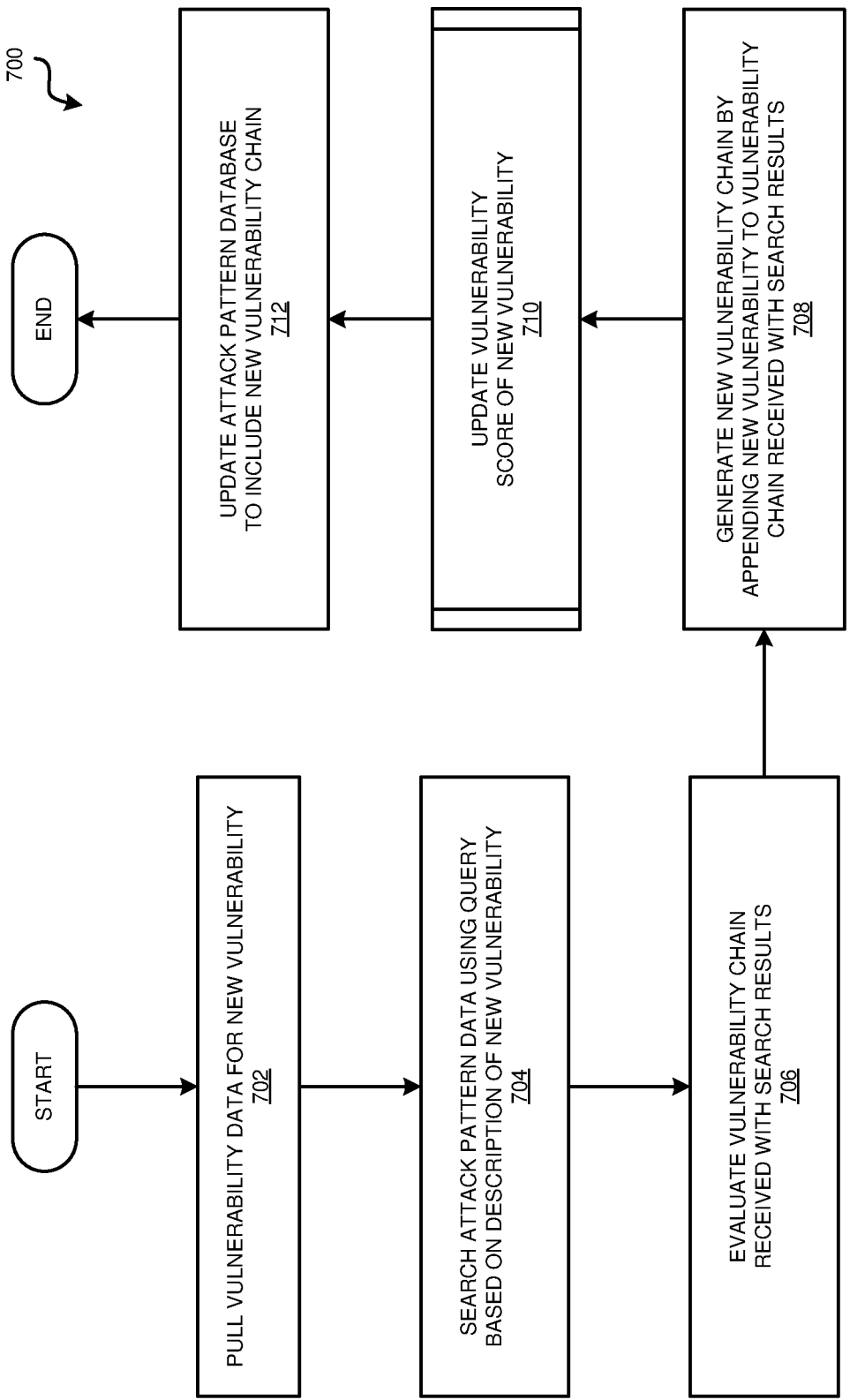
FIG. 7 depicts a flowchart of an example process for automatically performing a holistic evaluation of vulnerabilities in a vulnerability chain in accordance with an illustrative embodiment.

With reference to FIG. 7, this figure depicts a flowchart of an example process 700 for automatically performing a holistic evaluation of vulnerabilities in a vulnerability chain in accordance with an illustrative embodiment. In a particular embodiment, the vulnerability evaluation module 200 carries out the process 700.

At block 702, the process pulls vulnerability data for a new vulnerability. In some embodiments, the new vulnerability is pulled from a remote vulnerability database. In some embodiments, remote vulnerability database is a public vulnerability database, such as the National Vulnerability Database (NVD) published by the National Institute of Standards and Technology (NIST). In some embodiments, the vulnerability data includes a vulnerability score and a description string associated with each new vulnerability. In some embodiments, the process periodically polls the vulnerability database for new vulnerabilities. In alternative embodiments, the process receives push notifications from the vulnerability database that notify the process about new vulnerabilities being available in the vulnerability database.

Next, at block 704, the process searches vulnerability chain (which may be representative of an attack pattern) data using a query based on the description of the new vulnerability. In some embodiments, when the process receives information about a new vulnerability, the process determines whether the new vulnerability may be used in a known vulnerability chain. For example, the process may include detecting that the new vulnerability achieves a result that is also achieved by a previously known vulnerability (or by a combination of previously known vulnerabilities) that has been used in one or more previously known vulnerability chains. In some such embodiments, the process includes assembling and evaluating a new vulnerability chain that includes the new vulnerability in place of the previously known vulnerability or adding the new vulnerability along a new path as an alternative to the previously known vulnerability.

Thus, in some embodiments, at block step 704 the process invokes a search of known vulnerability chains. In some embodiments, the process searches one or more information sources, which may include one or more local and/or remote repositories. In an exemplary embodiment, the process invokes a search of a local SIEM database. In some embodiments, the vulnerability data for the new vulnerability includes a description string that includes key details about the new vulnerability, such as a vulnerability type (e.g., cross-site scripting, SQL injection, etc.), name(s) and version(s) of software and/or hardware products affected by the new vulnerability, and inputs and/or processes required to exploit the vulnerability. In some such embodiments, the process generates a database query based on one or more words from the vulnerability description string associated with the new vulnerability. For example, in some embodiments, the process may include using a key word or phrase matching technique that includes extracting key words from the vulnerability description and then building one or more database queries using the extracted key words. For example, the process may include assembling a query for vulnerabilities that affect any version of the same product that is affected by the new vulnerability, and/or a query for vulnerabilities that are the same type and require the same inputs as the new vulnerability, and/or various other queries. In some embodiments, the process may include accessing query templates that are used to assemble database queries. In some such embodiments, the process includes selecting from among the available templates depending on the information available in the description string associated with the new vulnerability. For example, if the description string lacks information about inputs required to exploit the new vulnerability, the process will use only the templates that do not require information about the inputs. The process then issues the query to the SIEM database (or other data source).

Next, at block 706, the process evaluates a vulnerability chain received with the search results. For example, if the query was issued to a SIEM database, the process includes receiving a response from the SIEM database that includes a list of one or more vulnerability chains that include at least one previously known vulnerability that matches the query (or responds with an indication that no records match the query). The format and content of the search results may vary depending, for example, on how the data is organized in the SIEM database. For example, the SIEM database may return a list of one or more vulnerability chains, where each vulnerability chain includes a plurality of linked vulnerabilities.

In some embodiments, the process at block step 706 includes analyzing each vulnerability chain received in the search results to determine how the vulnerability chain may be modified to use the new vulnerability. In some embodiments, the process identifies one or more vulnerability characteristics of one or more of the vulnerabilities in the vulnerability chain to determine whether any of the vulnerabilities may be replaced with the new vulnerability. For example, the process may identify a vulnerability that is linked to other vulnerabilities in a known vulnerability chain and may detect that this linked vulnerability affects the same product as the new vulnerability but affects an older version of the same product. The process may then recognize that the new vulnerability may be used as an alternative to the linked vulnerability in situations where the newer version of the product is being exploited. In some embodiments, the process may include accessing rules for recognizing such potential substitutions. In some such embodiments, the process evaluates the query results for patterns that match any of the rules, and then identifies vulnerability substitutions by identifying patterns that satisfy one or more of the rules.

Next, at block 708, the process generates a new vulnerability chain by appending the new vulnerability to the vulnerability chain received with search results. In some embodiments, the process generates a new vulnerability chain that includes the new vulnerability. For example, in some embodiments, the process generates a new vulnerability chain by generating a copy of the known vulnerability chain and then appending the new vulnerability to the copy of the known vulnerability chain. Alternatively, in some embodiments, the process generates a new vulnerability chain by modifying the known vulnerability chain rather than creating a new copy of the known vulnerability chain. In some such embodiments, the process appends the new vulnerability to the copy of the known vulnerability chain by adding a new path that includes the new vulnerability as an alternative to the matching previously linked vulnerability.

Next, at block 710, the process updates the vulnerability score of the new vulnerability. In some embodiments, the new vulnerability includes a score that is indicative of the severity of the vulnerability. In some embodiments, the score is provided with the vulnerability data that the process receives from the vulnerability database. The score may be a numerical (e.g., on a scale of 0-10) or textual (e.g., low, medium, or high) representation of the severity of the vulnerability itself, i.e., in isolation. For example, in some embodiments, the new vulnerability includes a CVSS score.

In some embodiments, the process evaluates the new vulnerability within the context of the new vulnerability chain. In some embodiments, the process assigns an updated vulnerability score to the new vulnerability that accounts for potentially higher risks that may result from using the new vulnerability with other vulnerabilities in a new high-risk vulnerability chain. In some cases, the process uses the process 800 shown in FIG. 8 to update the vulnerability score of the new vulnerability.

Next, at block 712, the process updates the vulnerability chain database to include the new vulnerability chain. In some embodiments, the process updates the SIEM database to include the new vulnerability, the new vulnerability chain, and the updated vulnerability score. In some embodiments, the may also, or alternatively, provide the new vulnerability, the new vulnerability chain, and/or the updated vulnerability score to one or more other data sources.

Figure 8:
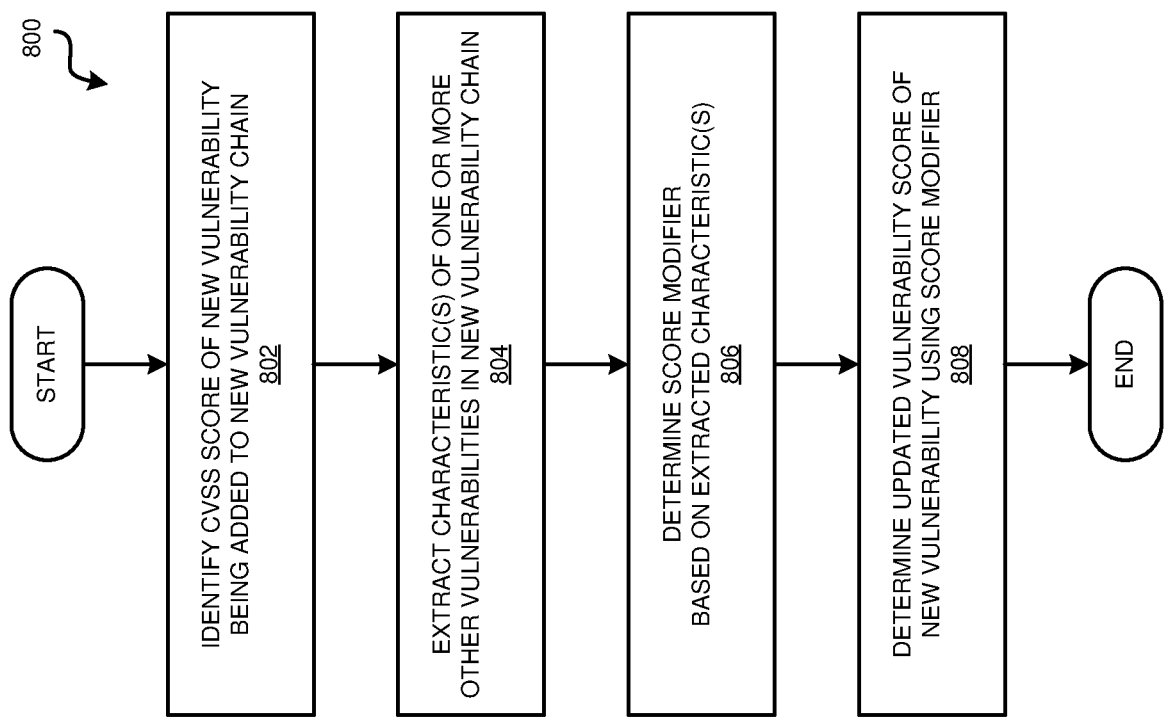
FIG. 8 depicts a flowchart of an example process for automatically updating the vulnerability score of a new vulnerability in accordance with an illustrative embodiment.

With reference to FIG. 8, this figure depicts a flowchart of an example process 800 for automatically updating the vulnerability score of a new vulnerability in accordance with an illustrative embodiment. In a particular embodiment, the vulnerability scoring module 410 of FIG. 4 carries out the process 800. In some cases, this process may change a score indicative of a low- or medium-risk vulnerability (based on the vulnerability in isolation) to an updated score indicative of a high- or critical-risk vulnerability. This, in turn, allows the priority of the new vulnerability to be escalated to prevent exploitation of the new vulnerability in the new high-risk vulnerability chain. In some embodiments, the updated vulnerability score is based on one or more vulnerability characteristics of the new vulnerability in combination with one or more vulnerability characteristics of other vulnerabilities in the new vulnerability chain and/or one or more vulnerability characteristics of the new vulnerability chain.

At block 802, the process identifies the CVSS score of a new vulnerability being added to a new vulnerability chain. The updated vulnerability score is based on a combination of several subsets of scores. In the illustrated embodiment, the CVSS score for the new vulnerability (based on the vulnerability in isolation) is used as a base score component.

Next, at block 804, the process extracts characteristic(s) of one or more other vulnerabilities in new vulnerability chain. In some embodiments, these characteristics are used as a basis for determining subscore characteristics of the vulnerability chain, which in turn are used to determine a score modifier that, in turn, is used to update the vulnerability score of the new vulnerability. In some embodiments, the vulnerability chain characteristics include a tension subscore, a breakpoint subscore, a link assurance subscore, and a robustness subscore that allow for more effective prioritization. These four subscores are determined using metrics for assessing the gross relative risk of the vulnerability chain, the probability of mitigating the vulnerabilities in the chain, the probability of a successful attack, and the susceptibility of the vulnerable component.

Next, at block 806, the process determines a score modifier based on the extracted characteristic(s). In some embodiments, these metrics are used to assign respective scores to the vulnerability chain, which are then normalized and may be assigned respective weights according to user preferences that allow for one or more of these metrics to be emphasized or de-emphasized. The normalized, weighted values may then be combined to generate a single score modifier that can, at block step 808, be applied to the individual vulnerability scores of each of the vulnerabilities in the vulnerability chain. In some cases, this may result in an increase in one or more of the vulnerability scores, which in turn may result in an increase in the priority of these vulnerabilities.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   invoking a search of vulnerability chain data of a local database using a database query to obtain a search result, wherein the database query is formed, at least in part, using a set of tokens based on a phrase extracted from a description string associated with a new vulnerability, and wherein the search result comprises a plurality of linked vulnerabilities that collectively form a vulnerability chain;
   identifying a vulnerability characteristic of a linked vulnerability of the plurality of linked vulnerabilities in the vulnerability chain;
   generating, as a new vulnerability chain, a modified version of the vulnerability chain by appending the new vulnerability to the vulnerability chain;
   assigning an updated vulnerability score to the new vulnerability based at least in part on the identified vulnerability characteristic of the linked vulnerability, wherein the updated vulnerability score is computed using a level of emphasis associated with the identified vulnerability characteristic of each linked vulnerability of the plurality of the vulnerabilities in the vulnerability chain; and
   updating the local database to include the new vulnerability chain and the updated vulnerability score.

2. The computer-implemented method of claim 1, wherein the vulnerability chain comprises a directed graph that includes data nodes that represent vulnerabilities, and edges represent paths between vulnerabilities.

3. The computer-implemented method of claim 2, wherein the generating of the new vulnerability chain comprises adding a new data node to the directed graph representative of the new vulnerability and adding an edge to the directed graph defining a path between one of the data nodes and the new data node.

4. The computer-implemented method of claim 3, wherein the adding of the new data node comprises adding a new path from a source node of the directed graph to a target node of the directed graph.

5. The computer-implemented method of claim 2, wherein the generating of the new vulnerability chain comprises traversing nodes along the paths over directed links in the directed graph and determining one of the data nodes of the directed graph to link to a new data node that represents the new vulnerability.

6. The computer-implemented method of claim 1, further comprising:
   generating, based on the description string, the set of tokens of a database syntax, wherein the tokens are each matched to a respective fragment of the description string; and
   forming the database query using a sequence of the set of tokens.

7. The computer-implemented method of claim 6, wherein tokens in the set of tokens are each matched to a respective word of the phrase extracted from the description string.

8. The computer-implemented method of claim 1, further comprising:
   identifying the vulnerability characteristic of the new vulnerability; and
   assigning updated vulnerability scores to the linked vulnerabilities based at least in part on the identified vulnerability characteristic of the new vulnerability.

9. The computer-implemented method of claim 1, wherein the new vulnerability comprises a Common Vulnerabilities and Exposures (CVE) identifier string.

10. The computer-implemented method of claim 1, wherein the vulnerability score of the new vulnerability is a Common Vulnerability Scoring System (CVSS) score.

11. The computer-implemented method of claim 1, further comprising:
   receiving data indicative of the new vulnerability from the National Vulnerability Database (NVD).

12. The computer-implemented method of claim 1, wherein the vulnerability chain is representative of an attack pattern.

13. A computer program product comprising one or more computer readable storage media, and program instructions collectively stored on the one or more computer readable storage media, the program instructions executable by a processor to cause the processor to perform operations comprising:
   invoking a search of vulnerability chain data of a local database using a database query to obtain a search result, wherein the database query is formed, at least in part, using a set of tokens based on a phrase extracted from a description string associated with a new vulnerability, and wherein the search result comprises a plurality of linked vulnerabilities that collectively form a vulnerability chain;
   identifying a vulnerability characteristic of a linked vulnerability of the plurality of linked vulnerabilities in the vulnerability chain;
   generating, as a new vulnerability chain, a modified version of the vulnerability chain by appending the new vulnerability to the vulnerability chain;
   assigning an updated vulnerability score to the new vulnerability based at least in part on the identified vulnerability characteristic of the linked vulnerability, wherein the updated vulnerability score is computed using a level of emphasis associated with the identified vulnerability characteristic; and
   updating the local database to include the new vulnerability chain and the updated vulnerability score.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

16. The computer program product of claim 13, wherein the operations further comprise:
   identifying the vulnerability characteristic of the new vulnerability; and
   assigning updated vulnerability scores to the linked vulnerabilities based at least in part on the identified vulnerability characteristic of the new vulnerability.

17. The computer program product of claim 13, wherein the vulnerability chain comprises a directed graph that includes data nodes that represent vulnerabilities, and edges represent paths between vulnerabilities.

18. A computer system comprising a processor and one or more computer readable storage media, and program instructions collectively stored on the one or more computer readable storage media, the program instructions executable by the processor to cause the processor to perform operations comprising:
   invoking a search of vulnerability chain data of a local database using a database query to obtain a search result, wherein the database query is formed, at least in part, using a set of tokens based on a phrase extracted from a description string associated with a new vulnerability, and wherein the search result comprises a plurality of linked vulnerabilities that collectively form a vulnerability chain;
   identifying a vulnerability characteristic of a linked vulnerability of the plurality of linked vulnerabilities in the vulnerability chain;
   generating, as a new vulnerability chain, a modified version of the vulnerability chain by appending the new vulnerability to the vulnerability chain;
   assigning an updated vulnerability score to the new vulnerability based at least in part on the identified vulnerability characteristic of the linked vulnerability, wherein the updated vulnerability score is computed using a level of emphasis associated with the identified vulnerability characteristic; and
   updating the local database to include the new vulnerability chain and the updated vulnerability score.

19. The computer system of claim 18, wherein the operations further comprise:
   identifying the vulnerability characteristic of the new vulnerability; and assigning updated vulnerability scores to the linked vulnerabilities based at least in part on the identified vulnerability characteristic of the new vulnerability.

20. The computer system of claim 18, wherein the vulnerability chain comprises a directed graph that includes data nodes that represent vulnerabilities, and edges represent paths between vulnerabilities.

* * * * *